Nov. 11, 1941.  F. H. GULLIKSEN  2,262,361
SPEED REGULATOR
Filed Sept. 7, 1939
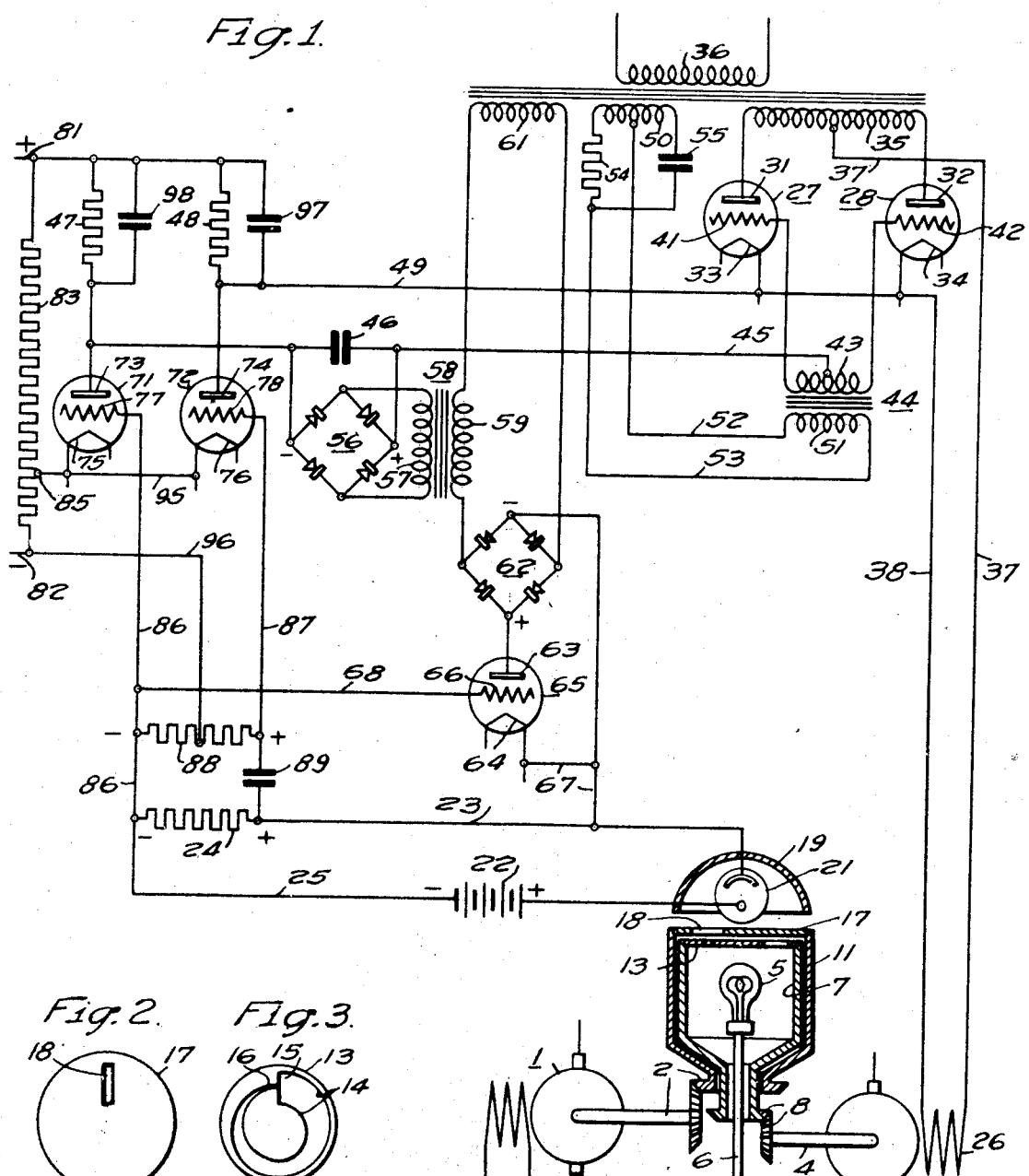
Fig. 1.
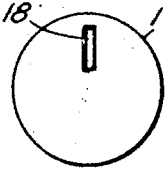
Fig. 2.
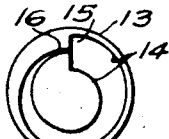
Fig. 3.
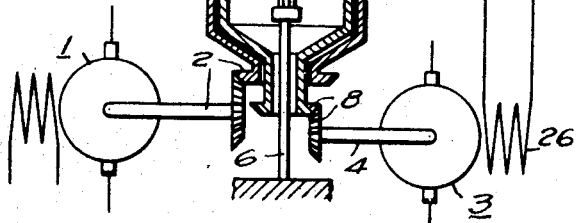
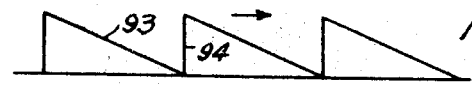
Fig. 4.
Fig. 5.
WITNESSES:
E. A. M'Closkey.
Nu. C. Groome
INVENTOR
Finn H. Gulliksen.
BY
Franklin E. Hardy
ATTORNEY Patented Nov. 11, 1941

2,262,361

UNITED STATES PATENT OFFICE 2,262,361

SPEED REGULATOR

Finn H. Gulliksen, Pittsburgh, Pa., assignor to Westinghouse Electric & Manufacturing Company, East Pittsburgh, Pa., a corporation of Pennsylvania Application September 7, 1939, Serial No. 293,728

1 Claims. (Cl. 172—293)

My invention relates to electronic speed regulators and is particularly adapted for regulating the speed of an electric motor in a manner to cause it to follow the speed of a master motor or speed reference device.

In industrial applications where a plurality of separate section driving motors are employed for driving the individual sections of a machine and it is desired to maintain a predetermined speed relation therebetween, sectional speed regulator systems have been employed for controlling the speeds of the several section driving motors with respect to the speed of a master motor. It is customary in such regulator systems to employ a mechanical differential device that is responsive both to the speed of the regulated motor and to the speed of the master motor for developing a control impulse that varies in response to the differential relationship between these two revolving members. Such devices usually take the form of mechanical differential mechanisms which are not practical when electronic regulators are employed because such devices are relatively large and expensive parts of the apparatus.

It is an object of my invention to provide an electronic speed regulator system for electric motors in which the corrective impulse is established by varying the rate of flow of unidirectional current in a detector circuit.

It is a further object of the invention to provide means differentially responsive to a master speed reference means and to the speed of the regulated motor that is simple in operation, inexpensive to manufacture, and that is quickly sensitive to variations in the speed of the regulated motor from its desired value.

Other objects and advantages of the invention will be apparent from the following description of a preferred embodiment thereof, reference being made to the accompanying drawing, in which Figure 1 is a schematic diagram of circuits and apparatus employed in one embodiment of the invention;

Figs. 2 and 3 are detailed views of parts of the apparatus shown in Fig. 1; and

Figs. 4 and 5 are curves illustrating the operation of the equipment.

Referring particularly to Fig. 1 of the drawing, a motor 1 is illustrated which is operative to drive a shaft 2 at a speed that is a measure of the desired speed of operation of a regulated motor 3, the armature of which is connected to drive a shaft 4. A lamp 5 is shown mounted upon a support 6 and enclosed within a rotatable housing 7 that is connected through gearing 8 to be driven in accordance with the speed of the regulated motor 3. An outer housing 11 is provided enclosing the housing 7 and connected through gearing 12 to rotate in accordance with the speed of the master motor 1. A disc 13 is provided at the upper end of the housing 7 and, as best shown in Fig. 3, is provided with a circumferential slot 14 of varying width from a maximum value at 15 to a minimum value at 16. The housing 11 carries a disc 17 at its upper end, which is provided with a narrow slot 18 that extends outward radially from the axis of rotation of the disc, as best shown in Fig. 2. The relative positions of the discs 17 and 13 determine the intensity of a light beam from the lamp 5 to a reflector 19 for controlling the conductivity of a photo tube 21 which possesses the characteristic of becoming more conductive to the flow of electric current therethrough when subjected to increasing intensities of illumination. The illumination of the phototube 21 determines the flow of current through a detector circuit from a source of direct current energy, such as the battery 22, through the conductor 23, the resistor 24 and the conductor 25.

The regulated motor 3 is provided with a field winding 26, the excitation of which controls the motor speed. The field winding is supplied with energy from a full-wave rectifier comprising grid controlled tubes 27 and 28. The tubes 27 and 28 are provided with anodes 31 and 32, respectively, and with cathodes 33 and 34, respectively, the anodes being connected to the opposite ends of a secondary winding 35 of a transformer having a primary winding 36. The field winding circuit extends from the midpoint of the winding 35 through conductor 37, field winding 26, conductor 38, through the tubes 27 and 28 to the transformer winding 35. The tubes 27 and 28 are also provided with control grids 41 and 42, respectively, that are connected to the opposite terminals of the secondary winding 43 of a grid transformer 44. The grid-control circuit extends from the center point of the winding 43 through conductor 45, a condenser 46, resistors 47 and 48 and conductor 49 to the cathodes 33 and 34 of tubes 27 and 28, respectively. The grid transformer 44 is provided with a primary winding 51 that is connected by conductors 52 and 53 to a well known type of phase shift circuit comprising the secondary transformer winding 58, a resistor 54, and condenser 55 for applying a voltage to the grid circuit that is out of phase with the voltage applied between the anodes and cathodes of the tubes 27 and 28.

The potential across the condenser 46 is determined by the output voltage of the full-wave rectifier 56 which may be of the dry or copper-oxide type, the alternating current terminals of which are connected to be supplied with energy from the secondary winding 57 of a transformer 58. The primary winding 59 of the transformer 58 is supplied from the secondary winding 61 and is connected in series with a load device, such as the rectifier 62, here shown as a full-wave rectifier of the dry or copper-oxide type. The output or direct current terminals of the rectifier 62 are connected to the anode 63 and cathode 64 of a tube 65, the conductivity of which is determined by the control grid 66. The control circuit for the grid 66 extends from the cathode 64 through conductors 67 and 23, resistor 24 and conductors 86 and 68 to the grid 66.

The voltage drop across the resistors 47 and 48 are determined by operation of grid controlled tubes 71 and 72 provided with anodes 73 and 74, respectively, cathodes 75 and 76, respectively, and control grids 77 and 78, respectively. A direct current supply of energy, represented by conductors 81 and 82, is provided between which conductors a resistor 83 is shown connected, and to some intermediate point 85 thereon the cathodes 75 and 76 are connected to give the desired voltage drop across the tube terminals. The control grids 77 and 78 are connected by conductors 86 and 87, respectively, to the opposite ends of a resistor 88, one end of which is connected to one end of the resistor 24 by the conductor 86 and the opposite ends of which are connected together through a condenser 89 so that changes in the voltage across the resistor 88 follows that across the resistor 24 but with a time lag. The direction of voltage drop across certain of the various parts of the circuits are shown in Fig. 1 of the drawing.

Referring to the operation of the system disclosed, it will be apparent that the regulator is essentially a "phase angle" regulator in which the energization of the field winding 26 of the motor 3 is varied in accordance with a change in the phase angle position between the shafts 2 and 4 which effect a corresponding change in the phase angle relationship between the discs 17 and 13 on the two housings 11 and 7, and consequently a change in the intensity of the illumination that impinges on the phototube 21. It is obvious that a variable amount of light is permitted to impinge on the phototube 21 depending upon the relative positions of the shafts 2 and 4. If the discs 13 and 17 are in the relative positions shown in Figs. 3 and 2, the illumination on the phototube will be low. If the disc 13 is turned clockwise relative to the disc 17, the illumination on the phototube increases as the width of the slot 14 increases from the narrow value shown at 16 to a greater width depending upon the degree of movement of the disc 13 until it has moved through approximately 360°. If the system is so arranged that normal motor speed results from a displacement of the disc 13 through 180° from its illustrated position in Fig. 3 so that an intermediate width of the slot 14 is adjacent the slot 18 on the disc 17, then a change in the position of the disc 13 in the one or the other direction from this position will correspondingly vary the intensity of illumination on the tube 21 in the one or the other positions.

If the two discs 13 and 17 are in the 180° position and the speed of the motor 3 increases slightly above its desired speed, the disc 13 will move in a clockwise direction with respect to the disc 17, thus increasing the illumination on the phototube 21. This increase in illumination on the phototube 21 causes an increased current flow from the battery 22 through the resistor 24, thus causing the grid 66 of the tube 65 to become more negative so that less current flows through the tube 65. Consequently, the load on the rectifier 62 is decreased, and the voltage drop thereacross correspondingly decreased, so that the voltage across the winding 59 is increased more nearly to the voltage of the secondary winding 61. This increase in voltage is reflected in the secondary winding 57 to apply a greater voltage to the rectifier 56 applied across the condenser 46, thus making the control grids 41 and 42 more positive and increasing the flow of current in the field winding 26 to decrease the motor speed. Should the speed of the motor 3 decrease with respect to that of the motor 1, the phase angle relation between the discs 13 and 17 would vary in the opposite direction, thus decreasing the illumination on the phototube 21 and producing the reverse result in the circuits just described, thus decreasing the current supplied to the field winding 26 and increasing the motor speed.

In the description of the control circuits for effecting variations in the excitation of the field winding 26 thus far described, it has been assumed that the potential drop across the resistors 47 and 48 will not appreciably affect the grid potentials of the tubes 27 and 28. This will be true providing the rate of change in phase angle between the discs 13 and 17 takes place slowly and they are in the intermediate portion of the operating range of the equipment. It will be noted that when the disc 13 moves in a clockwise direction with respect to the disc 17, the illumination varies substantially along the curve shown in Fig. 4, that is, gradually increases over a portion 91 until the 360° position is reached when the illumination drops suddenly, as shown by the portion of the curve 92. If the speed of the motor 3 decreases, the disc 13 will move in a counterclockwise direction with respect to the disc 17 so that the illumination will vary in accordance with the curve shown in Fig. 5, that is, it will decrease gradually over the 360° as shown by the portion of the curve 93 and increase suddenly, as shown at 94. If the phase angle relation between the discs 13 and 17 varies past the 360° position so as to effect an abrupt change in the illumination of the tube 21, as shown by the portions 92 and 94 of the curves in Figs. 4 and 5, respectively, the effect of the change in illumination on that portion of the control circuit, including the tube 65 and rectifiers 62 and 56, will reverse the direction of correction, which is undesirable. This condition is reached, for example, while the motor is being brought up to speed under which condition it is desirable to maintain a weak field on the motor regardless of the relative position of the discs 17 and 13 until the desired speed is reached and the relative motion between the discs becomes gradual.

In the regulator system described, circuits are provided for differentiating between changes in illumination occasioned by passing the 360° relation between the two discs and a change in illumination that is occasioned by a reversal in the direction of one disc with respect to the other. If the motor suddenly increases its speed so that the displacement between the discs 13 and 17 exceeds the 360° position, the illumination on the phototube 21 decreases abruptly substantially to zero value, causing a decrease in the current flow from the battery 22 through the resistor 24. This causes the condenser 89 to discharge through the local circuit including resistors 88 and 24 providing a large voltage across the resistor 88 with the polarity indicated in Fig. 1. This causes a large increase in the potential of the grid 78 of tube 72 with respect to the cathode 76 by adding a large positive voltage component in the grid control circuit which grid circuit extends from the cathode 76 through conductor 95, the lower portion of the resistor 83, conductor 96, the right-hand portion of resistor 88, and conductor 87. At the same time, a negative voltage component is introduced into the grid control circuit of the tube 71 which grid control circuit extends from the cathode 75, through conductor 95, the lower portion of the resistor 84, conductor 96, through the left portion of resistor 88 and conductor 86 to the grid 77 causing the tube 71 to become non-conducting. When the tube 72 becomes conductive, current flows therethrough charging the condenser 97 that is connected in parallel with the resistor 48 to a higher than normal value. At the same time, the normal charge on the condenser 98 connected in shunt to the resistor 47 is discharged through the resistor 47. The effect of the increasing charge on the condenser 97 and the decreasing charge on the condenser 98 results in differentially varying the voltage drop across the resistors 48 and 47 with a polarity in a direction to make the grids of the tubes 27 and 28 more positive, thus increasing the current through the field winding 26 to continue to decrease the motor speed. It is desirable that the circuit constants be so chosen that the voltage obtained from the resistors 47 and 48 predominate over the voltage component applied across the condenser 46 from the rectifier 56.

It will be apparent that if the motor speed decreases and the disc 13 passes through the 360° point, the opposite result will be effected, that is, the tube 71 will become more conductive and the tube 72 will become non-conductive so that a differential voltage across the resistors 47 and 48 in the grid controlled circuit of the tubes 27 and 28 will result in a differential polarity of opposite effect. The time constant of the circuits involving resistor 47 and condenser 98, and resistor 48 and condenser 97, should be so chosen that the voltage drop across the resistors 47 and 48 predominates the voltage across the condenser 46 during at least 180° relative motion of the two discs 13 and 17.

It will be apparent to those skilled in the art that modifications in the circuits and apparatus described may be made within the spirit of my invention and I do not wish to be limited otherwise than by the scope of the appended claims.

I claim as my invention:

1. In a regulator system, an electric motor, a master speed reference means operated at a speed that is a measure of the desired speed of the regulated quantity, a source of light, control mechanism having two relatively movable members the relative positions of which determine the intensity of a beam of light from said source, means responsive to the intensity of said beam of light for establishing a control potential, an electronic rectifier for supplying energy to the field winding of said motor, a grid control circuit therefor including a grid transformer and means for introducing a unidirectional potential into said grid control circuit that is a measure of said control potential, means for introducing two voltage components of opposite polarity into said grid control circuit, and means for oppositely varying the values of said two voltage components in accordance with the rate of change of said control potential.

2. In a regulator system, an electric motor, a master speed reference means operated at a speed that is a measure of the desired speed of the regulated quantity, a source of light and a light controlling mechanism comprising a pair of discs having apertures therein for varying the intensity of a beam of light therethrough from said source upon variations in the relative positions of said pair of discs, means for driving said two discs in the same direction at speeds corresponding, respectively, to the speeds of the motor and of the speed reference means, means responsive to the intensity of said beam of light for establishing a control potential, an electronic rectifier for supplying energy to the field winding of said motor, a grid control circuit therefor including a grid transformer, and means for introducing a unidirectional potential into said grid control circuit that is a measure of said control potential, means for introducing two voltage components of opposite polarity into said grid control circuit, and means for oppositely varying the values of said two voltage components in accordance with the rate of change of said control potential.

3. In a regulator system, an electric motor, a master speed reference means operated at a speed that is a measure of the desired speed of the regulated quantity, a source of light, control mechanism having two relatively movable members the relative positions of which determine the intensity of a beam of light from said source, means responsive to the intensity of said beam of light for establishing a control potential, an electronic rectifier for supplying energy to the field winding of said motor, a grid control circuit therefor including a grid transformer and means for introducing a unidirectional potential into said grid control circuit that is a measure of said control potential, two means for introducing voltage components having opposite polarity into said grid control circuit, and means for selecting the one or the other of said two means in accordance with the direction of change of said control potential.

4. In a regulator system, an electric motor, a master speed reference means operated at a speed that is a measure of the desired speed of the regulated quantity, a source of light, control mechanism having two relatively movable members the relative positions of which determine the intensity of a beam of light from said source, means responsive to the intensity of said beam of light for establishing a control potential, an electronic rectifier for supplying energy to the field winding of said motor, a grid control circuit therefor including a grid transformer and means for introducing a unidirectional potential into said grid control circuit that is a measure of said control potential, two grid-controlled means for introducing voltage components having opposite polarity into said grid control circuit, and means for oppositely varying the grid bias of said two grid-controlled means in accordance with the rate of change of said control potential for selecting the one or the other of said two means and for controlling the magnitude of the introduced voltage component.

FINN H. GULLIKSEN.